US005954518A

United States Patent [19]

Teichberg

[11] Patent Number: 5,954,518

[45] Date of Patent: Sep. 21, 1999

[54] BOOK WITH ROTATING CUT-OUT PORTION

[75] Inventor: Ira Teichberg, Weston, Conn.

[73] Assignee: Reader's Digest Children's Publishing, Inc., Westport, Conn.

[21] Appl. No.: 09/055,180

[22] Filed: Apr. 3, 1998

[51] Int. Cl.$^{6}$ .......................... A63H 33/38; G09B 25/00; B42D 3/18

[52] U.S. Cl. ............................ 434/404; 434/365; 281/29; 281/37; 446/149

[58] Field of Search .................................... 434/167, 178, 434/365, 219, 404, 428; 446/141, 151, 147, 149, 244; 281/29, 37

[56] References Cited

U.S. PATENT DOCUMENTS

| | | | |
|---|---|---|---|
| 1,177,652 | 4/1916 | Robertson . | |
| 2,516,367 | 7/1950 | Cloud | 446/244 |
| 2,917,325 | 12/1959 | Sines | 283/63.1 |
| 2,959,872 | 11/1960 | Rodgers . | |
| 3,191,328 | 6/1965 | Lohnes | 40/124.08 |
| 3,918,180 | 11/1975 | Chamberlin | 434/178 |
| 3,936,957 | 2/1976 | Nordbye | 35/74 |
| 4,313,270 | 2/1982 | Volkert et al. | 40/124.08 |
| 4,508,344 | 4/1985 | Krogh | 273/141 |
| 4,537,576 | 8/1985 | Thorsheim et al. | 434/404 |
| 4,640,512 | 2/1987 | Burke | 273/157 R |
| 4,642,054 | 2/1987 | Wada | 434/178 |
| 4,757,580 | 7/1988 | Wolf | 281/15.1 |
| 5,030,027 | 7/1991 | Bachrach et al. | 402/4 |
| 5,213,507 | 5/1993 | Ozrovitz | 434/178 |
| 5,284,365 | 2/1994 | Stuart | 283/117 |

*Primary Examiner*—Paul J. Hirsch
*Assistant Examiner*—Michael B. Priddy
*Attorney, Agent, or Firm*—Kenyon & Kenyon

[57] ABSTRACT

A children's book including a front cover, a back cover, and at least one leaf positioned between the front cover and the back cover. A spine portion of the book connects the front cover, the leaf and the back cover. The book further includes at least one attachment arrangement and at least one rotation member. The front cover, the leaf, and/or the back cover has at least one cut-out portion. The rotating member is rotatably connected to a respective front cover, back cover and/or leaf by positioned within the cut-out portion using the attachment arrangement so that the rotating member is rotatable about an axis extending along a plane of the book.

20 Claims, 6 Drawing Sheets

BOOK WITH ROTATING CUT-OUT PORTION

FIELD OF INVENTION

The present invention relates to an educational/entertaining book, and in particular to the book including a member rotating within a cut-out portion of the book.

BACKGROUND OF THE INVENTION

Various types of conventional books have been provided to the public for educating, entertaining, and amusing children. Often, educational books for children show different objects to be identified by children.

One such conventional book is described in U.S. Pat. No. 4,537,576. This conventional book enables children to interact with elements which illustrate various graphical information. The elements are rotatably attached to a base leaf and the elements are spun about an axis that is perpendicular (i.e., 90 degrees) to a plane of the book in a clockwise type manner. The book also has a second set of graphical information contained on aperture leaves.

Another U.S. Pat. No. 4,642,054 describes a picture book for children which has a window cut-out in its leaves. A telephone structure is attached to the pages of the book and can be seen through the window cut-out. The telephone structure is attached to an axis which is perpendicular (i.e., 90 degrees) to a plane of the book. A portion of the telephone structure spins about the axis in a clockwise type manner.

However, even though the above-described conventional books have elements which rotate on an axis which is perpendicular (i.e., 90 degrees) to a plane of the book, such elements cannot rotate about an axis extending along the plane of the book.

There is a need to provide an educational/entertaining book which allows a portion to rotate within a corresponding cut-out about an axis which extends along the plane of the book. Such book would allow a user (e.g., a child) to rotate (or spin) the rotatable portion which may have different images on each side of the rotatable portion, and thus maintain an interest of the user.

SUMMARY OF THE INVENTION

A book according to the present invention includes a front cover, a back cover, and at least one leaf positioned between the front cover and the back cover. The book also has a coupling portion connecting the front cover, the leaf and the back cover. The book further includes at least one attachment arrangement and at least one rotation member. The front cover, the leaf, and/or the back cover has at least one cut-out portion. The rotating member is positioned within the cut-out portion and is rotatably connected to a respective front cover, back cover, and/or leaf by the attachment arrangement so that the rotating member is rotatable about an axis extending along a plane of the front cover, the back cover, and/or the leaf to which the rotating member is connected to.

DETAILED DESCRIPTION OF THE INVENTION

Figure 1:
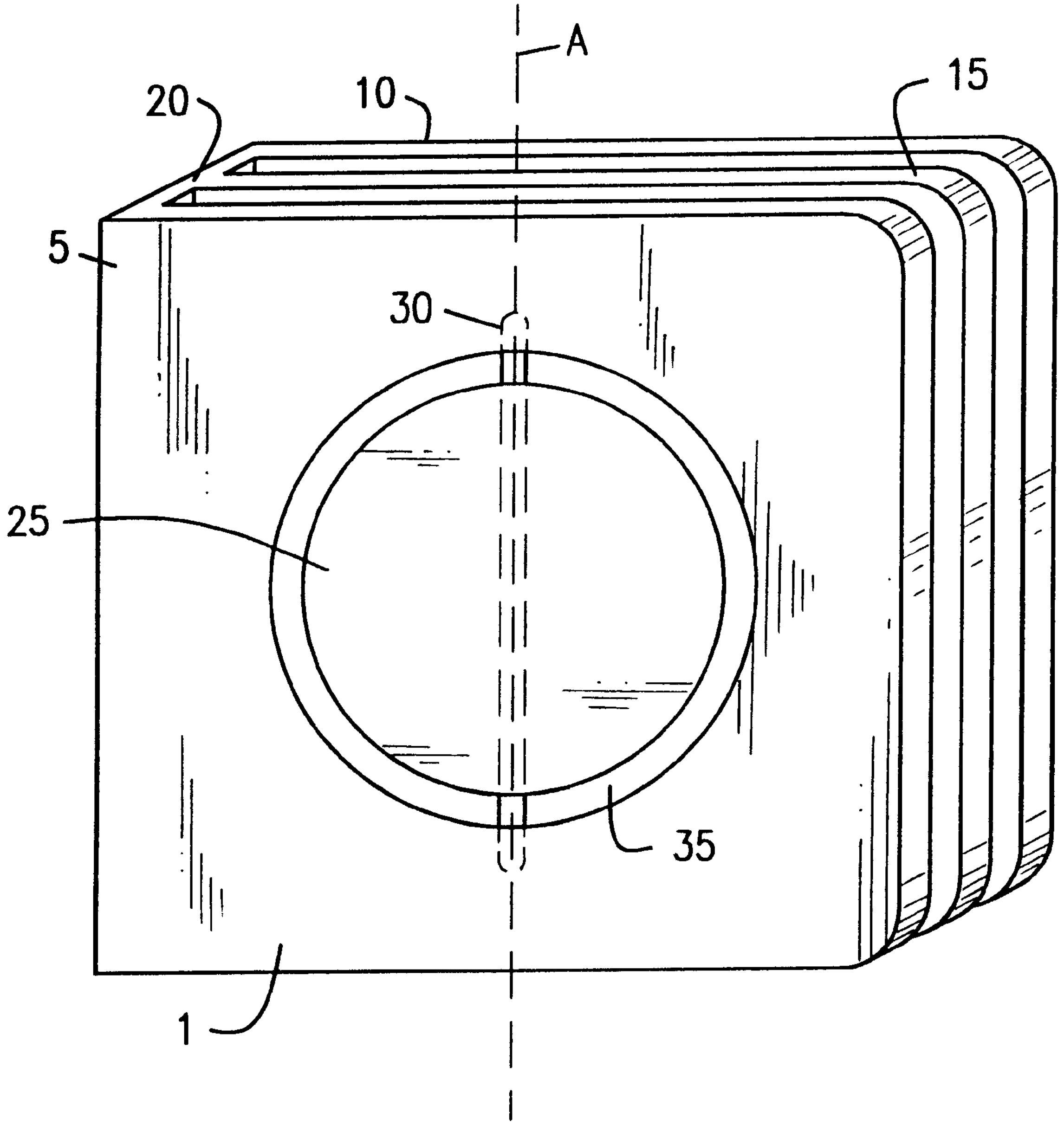
FIG. 1 shows a book with a rotating member within a cut-out portion according to the present invention.
Figure 2:
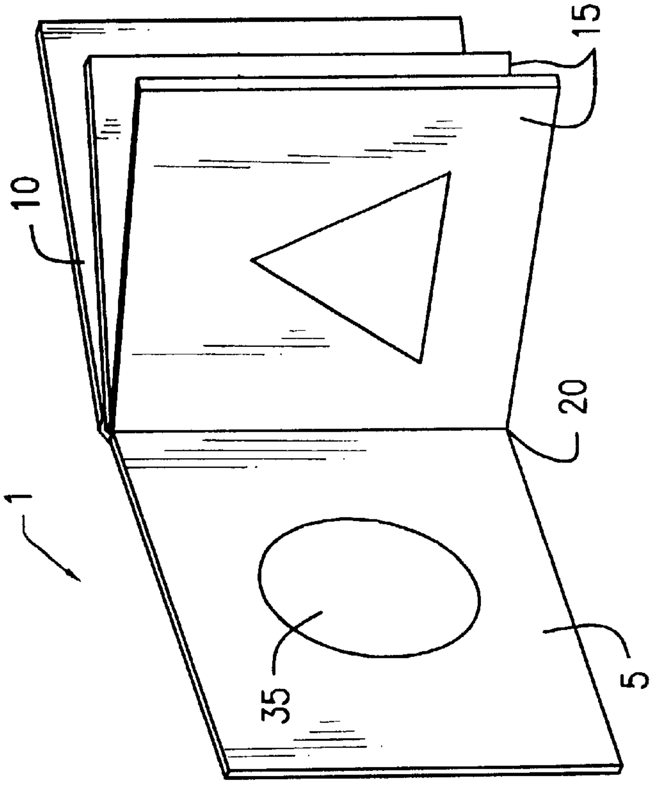
FIG. 2 shows an exemplary embodiment of the book illustrated in FIG. 1 in an open configuration.
Figure 3:
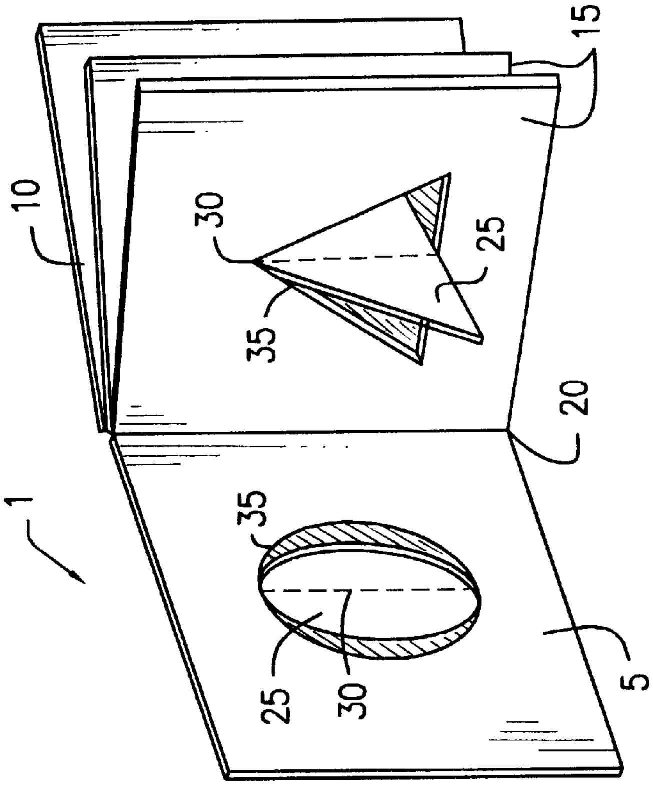
FIG. 3 shows another exemplary embodiment of the book in the open configuration.

FIGS. 1–3 show an exemplary embodiment of a book 1 according to the present invention. The book 1 has a front cover 5, a back cover 10 and at least one leaf 15 (e.g., a page) which is positioned between the front cover 5 and the back cover 10. The book 1 further includes a spine portion 20 which connects (i.e., binds) the front cover 5, the back cover 10 and the leaf 15.

In an alternative exemplary embodiment, the book 1 includes at least one binding (not shown) connecting the front cover 5, the back cover 10 and the leaf 15. The binding may be at least one binding ring (e.g., two, three or four rings). In addition, the binding may include any arrangement that is suitable to connect the front cover 5, the back cover 10 and the leaf 15.

As shown in FIG. 1, the front cover 5 has a cut-out portion 35. A rotating member 25 is positioned within the cut-out portion 35. The rotating member 25 has a periphery smaller than a periphery of the cut-out portion 35 so that the rotating member 25 can be situated within the cut-out portion 35. Thus, the rotating member 25 can freely rotate within the cut-out portion 35. The rotating member 25 is connected at the periphery of the cut-out portion 35 to the front cover 5 by an attachment arrangement 30. The attachment arrangement 30 (described below) enables the rotating member 25 to spin about an axis A which extends along a plane of the book 1. Preferably, when the rotating member 25 is positioned along the plane of the book 1, the book 1 can be fully closed by a user.

The cut-out portion 35 may have different shapes and sizes. For example, the cut-out portion 35 may have a circular shape (see FIGS. 1–3), a triangular shape (see FIG. 2–3), and/or a square shape (not shown). Other shapes and sizes are also conceivable (e.g., a shape of a story character, etc.). The rotating member 25 also may have different shapes and sizes. A shape of the rotating member 25 preferably corresponds to a shape of the cut-out portion 35. In alternative embodiment of the present invention, the shape of cut-out portion 35 may be different from the shape of the rotating member 25. However, the rotating member 25 preferably has a smaller periphery than the periphery of the cut-out portion 35 so that the rotating member 25 is free to rotate about the axis A.

FIGS. 1 and 4*a*–4*f* show an exemplary illustration of the attachment arrangement 30. In particular, the attachment arrangement 30 includes a first and second attaching devices 40, 45 and a first and second coupling members 50, 55. The first and second coupling members 50, 55 may be composed of a soft, elastic (stretchable) material, such as, e.g., a rubber band or a cord. In an alternative exemplary embodiment of the present invention, the first and second coupling members 50, 55 may be composed of a rigid material (e.g., a wire).

The first coupling member 50 is coupled to the first attaching device 40 via its first end 60, and to the rotating member 25 via its second end 61. For example, the second end 61 of the first coupling member 50 can extend to a predetermined portion of the rotating member 25 (e.g., within the rotating member 25 at a distance from the periphery of the rotating member 25) or can be coupled to the rotating member 25 at the periphery of the rotating member 25.

Similarly, the second coupling member 55 is coupled to the second attaching device 45 via its first end 62 and to the rotating member 25 via its second end 63. For example, the second end 63 of the first coupling member 55 can extend to a predetermined portion of the rotating member 25 (e.g., within the rotating member 25 at a distance from the periphery of the rotating member 25) or can be coupled to the rotating member 25 at the periphery of the rotating member 25.

Using the first and second coupling members 50, 55, the rotating member 25 is situated within the cut-out portion 35. The first and second attaching devices 40, 45 are situated on or in the front cover 5, the back cover 10, and/or the leaf 15 which have the respective cut-out portion 35. The first and second attaching devices 40, 45 maintain (e.g., permanently) the first and second ends 60, 61, 62 and 63 of the first and second coupling members 50, 55.

In an alternative exemplary embodiment of the present invention, the first and second coupling members 50, 55 can be releasibly locked to the respective first and second attaching devices 40, 45 with, e.g., a rigid attaching member Thus, the rotating member 25 (e.g., situated in the front cover 5) may be interchanged with another rotating member 25 (e.g., situated in the back cover 10 and/or in the leaf 15).

The first coupling member 50 and the second coupling member 55 may be a single coupling member extending through the rotatable member 25. The single coupling member would perform similar functions to those performed by the first and second coupling members 50, 55 as described above.

Figure 5:
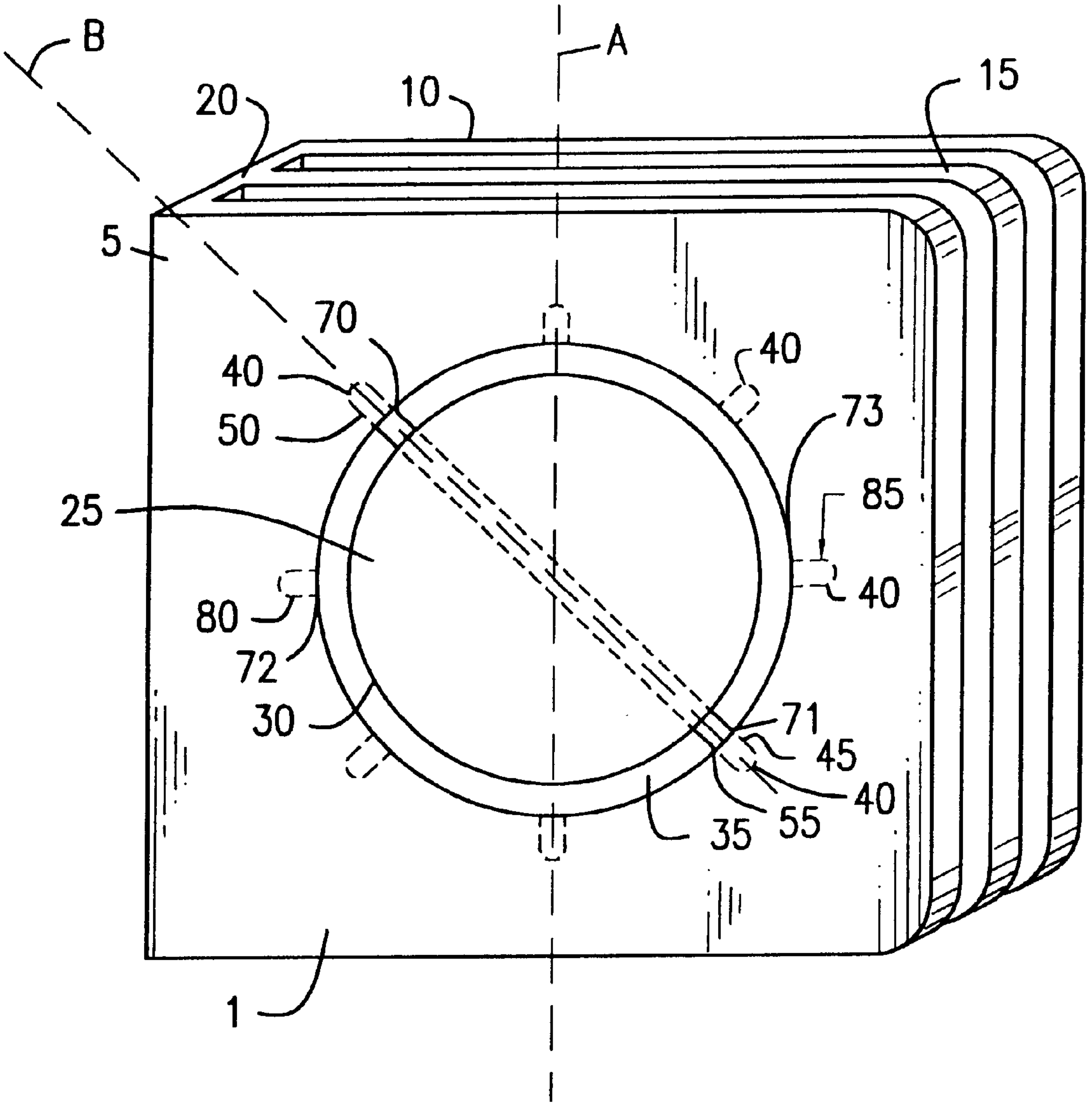
FIG. 5 shows a further exemplary embodiment of the book according to the present invention.

In another alternative exemplary embodiment of the present invention as shown in FIG. 5, the first and second coupling members 50, 55 connect to the rotatable member 25 so that the rotating member 25 can be rotated about an axis B extending at predetermined angle from the axis A. Other axes of rotation extending along the plane of the book (i.e., the front cover 5, the back cover 10 and/or the leaf 15) can be used for rotating the rotatable member 25. It is also possible, as shown in FIG. 5, to utilize two pairs of coupling members 50, 55 for connecting the rotatable member 25 to the front cover 5, the back cover 10, and/or the leaf 15.

Furthermore, it is possible to provide a predetermined number of the first and second attaching devices 40, 45 along the periphery of the cut-out portion 35 at the respective front cover 5, back cover 10 and/or the leaf 15 (as shown in FIG. 5). The first end 60 of the first coupling member 50 can be removed from the first attaching device 40 (e.g., a hole) at a first location 70, and the first end 62 of the second coupling member 55 can be removed from the second attaching device 45 (e.g., a hole) at a second location 71. Thereafter, the first coupling member 50 (e.g., still attached to the rotatable member 25) is rotatably connected to a further first attaching device 80 (e.g., a hole) at a third location 72, while the second coupling member 55 (e.g., still attached to the rotatable member 25) is rotatably connected to a further second attaching device 85 (e.g., a hole) at a fourth location 73.

Figures 4A, 4B, 4C, 4D, 4E, 4F:
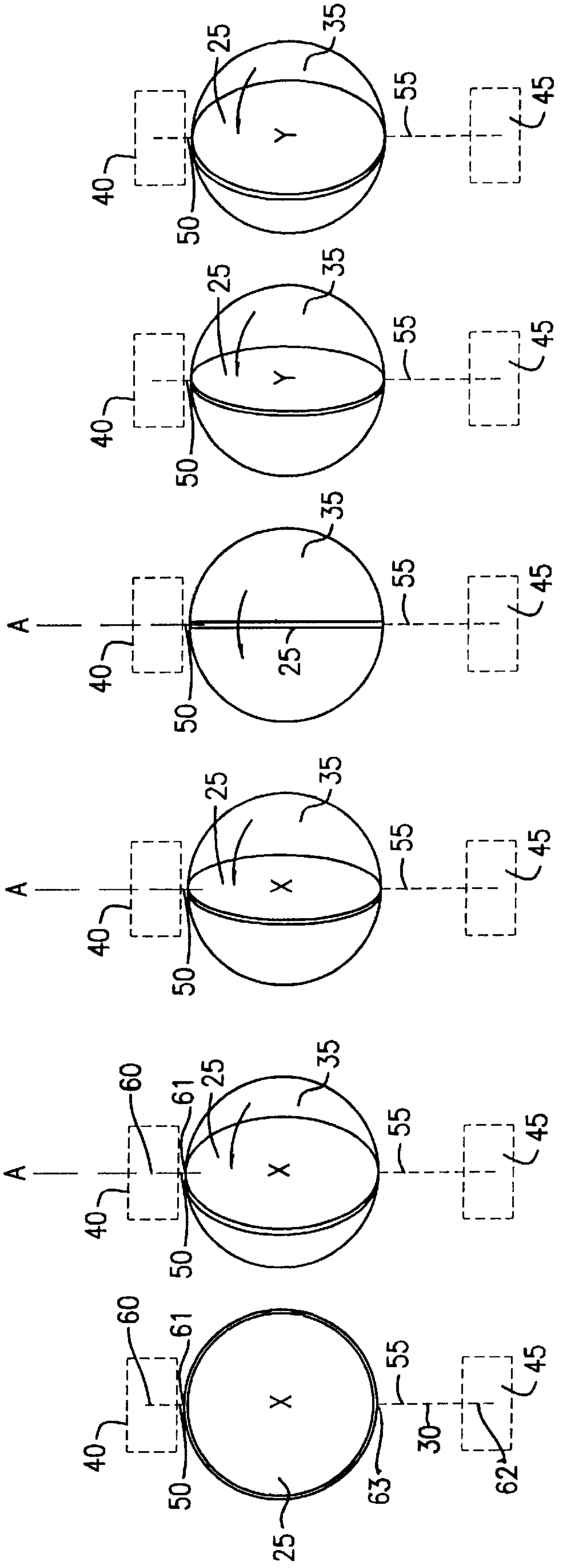
FIGS. 4*a* shows a first exemplary stage of a rotation of the rotating member within a cut-out portion of the book.
FIGS. 4*b* shows a second exemplary stage of the rotation of the rotating member within the cut-out portion of the book.
FIGS. 4*c* shows a third exemplary stage of the rotation of the rotating member within the cut-out portion of the book.
FIGS. 4*d* shows a fourth exemplary stage of the rotation of the rotating member within the cut-out portion of the book.
FIGS. 4*e* shows a fifth exemplary stage of the rotation of the rotating member within the cut-out portion of the book.
FIGS. 4*f* shows a sixth exemplary stage of the rotation of the rotating member within the cut-out portion of the book.

FIGS. 4*a*–4*f* show a rotating motion of the rotating member 25 about the axis A extending along the plane of the book 1. FIG. 4*a* shows a first side X of the rotating member 25 situated within the cut-out portion 35. The rotating member 25 can be rotated about the axis (e.g., the axis A extending along the plane of the book 1 as shown in FIGS. 4*b*–4*e*) to expose a second side Y of the rotating member 25 (as shown in FIG. 4*f*).

One of the advantages of the book 1 according to the present invention is that the book 1 can be used, among other things, to educate children. For example, a child would have to identify a text above, under and/or at the sides of the cut-out portion 35 and then match the text to another text or picture on the first side X or on the second side Y of the rotating member 25. Further, the child may remove the rotating member 25 from, for example, the front cover 5, and positioned it in a corresponding cut-out portion 35, for example of the back cover 10 according to predetermined educational instructions.

For example, an outside side of the front cover 5 may have text "Happy Moon" and an inside side of the front cover 5 may have text "Sad Moon". The first side X of the rotation member 25 may have a picture of a smiling moon, while the second side Y of the rotating member 25 may have a picture of the sad moon. The child would have to turn the rotating member 25 so that the picture of the smiling moon matches to the text "Happy Moon".

In an alternative embodiment of the present invention, the cut-out portion 35 of the front cover 5 may have, for example, a circular shape, and a text thereunder would state "Place a triangle". A child would be required to place the rotation member 25 which has a triangle shape into the cut-out portion 35.

Figure 6:
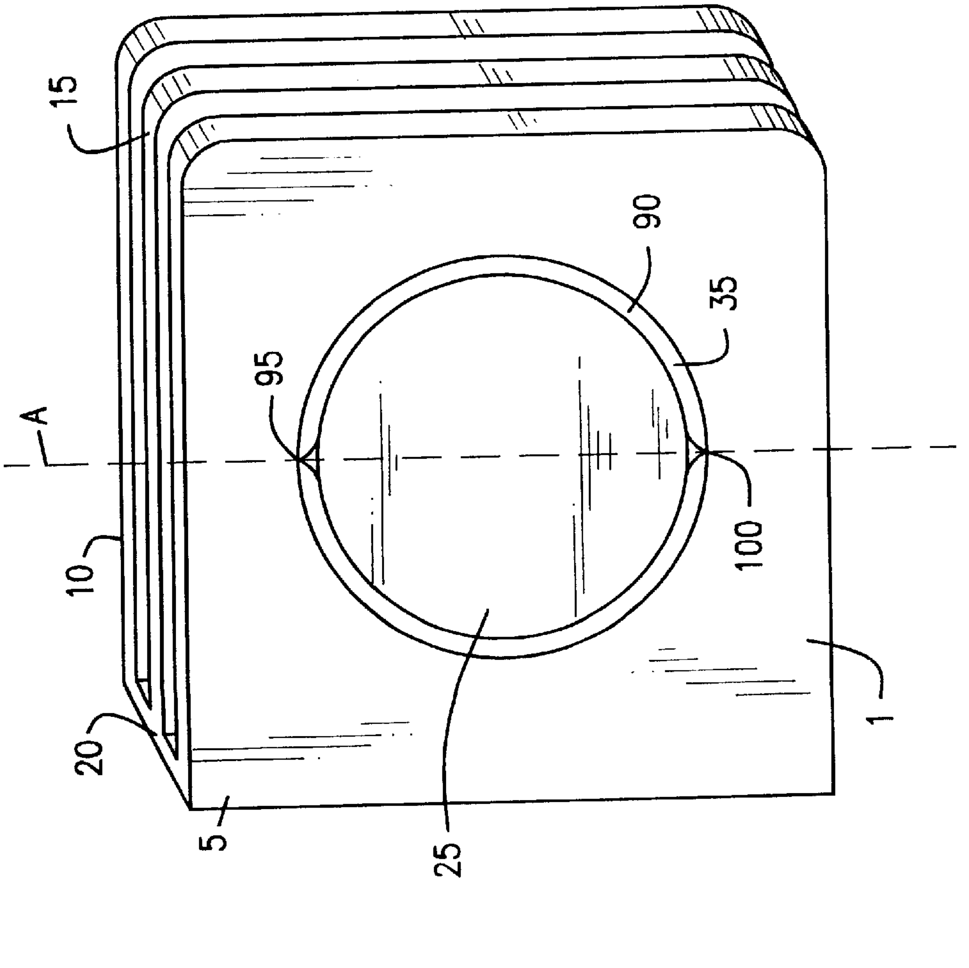
FIG. 6 shows yet another exemplary embodiment of the book according to the present invention.

FIG. 6 shows yet another alternative exemplary embodiment of the present invention. The rotating member 25 has a first and second contact ends 95, 100. The front cover 5, the back cover 10, and/or the leaf 15 includes a further arrangement 90 which is permanently attached to the cut-out portion 35.

Figure 7:
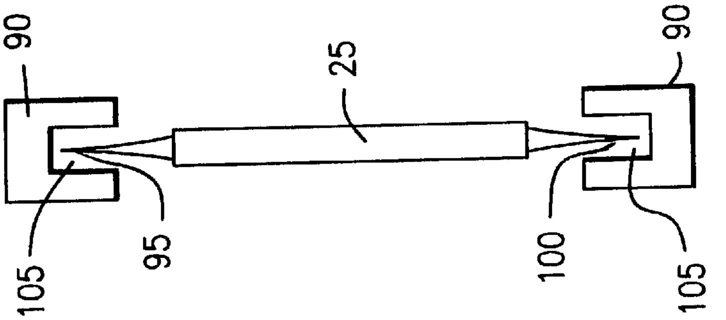
FIG. 7 shows a side view of an exemplary attachment of the cut-out portion and the rotating member illustrated in FIG. 6.

As shown in FIG. 7, the further arrangement 90 has a U-shape, for example, a shape of a U-shaped rail. The first and second contact ends 95, 100 extend within an internal side 105 of the further arrangement 90 to allow a clockwise rotation of the rotating member 25. One of the advantages of this embodiment according to the present invention is that together with the clockwise motion, the rotation member 25 may be simultaneously rotated about the axis A (or any other axis) extending along the plane of the book 1.

Figure 8:
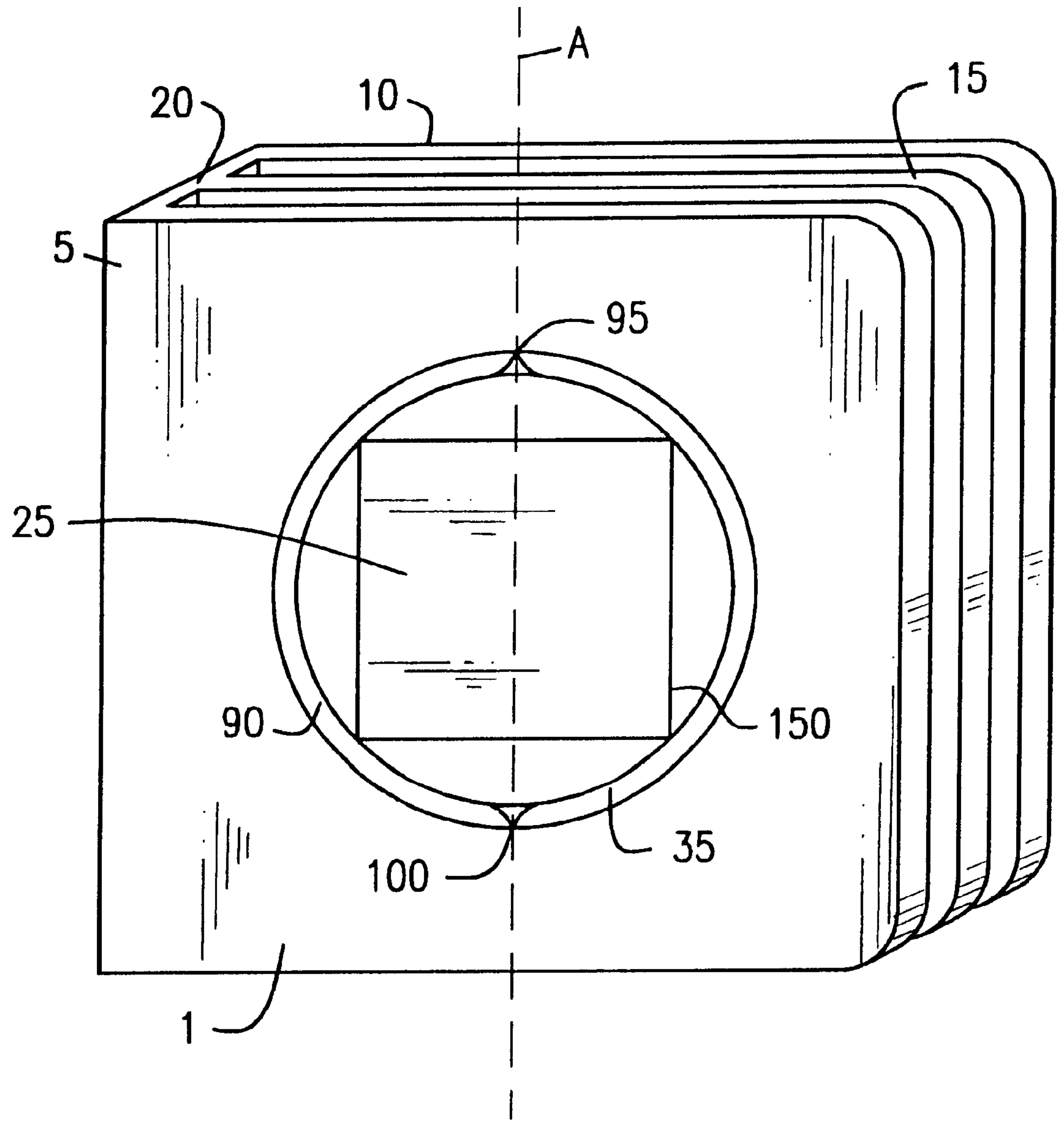
FIG. 8 shows a further exemplary embodiment of the book according to the present invention which includes a ring.

It is also conceivable to include a ring 150 attached to the internal side 105 of the further arrangement 90. The ring 150, shown in FIG. 8, may have a shape substantially similar to the shape of the internal side 105 which allows the ring 150 to be rotated within the internal side 105 in a clockwise manner. The rotating member 25 is attached to such ring 150 and functions similarly to the above-described embodiments, i.e. the rotating member 25 can rotate in a clockwise manner with 150 and/or without ring and can spin on the axis A (or any other axis) extending along the plane of the book 1.

In an alternative exemplary embodiment, the further arrangement 90 and/or the rotating member 25 may be composed of a magnetic material. Utilizing the magnetic material allows the clockwise motion and/or the rotation about the axis A (or any other axis) extending along the plane of the book 1 without actually contacting the further arrangement 90 with the rotating member 25. It is also possible to obtain similar advantages by utilizing the magnetic material for generating the first and second coupling members 50, 55, the first and second attaching devices 40, 45 and/or the rotating member 25 as descried above and shown in FIGS. 1–5.

It is also conceivable to provide the cut-out portion 35 in a center position of the front cover 5, the back cover 10, and/or the leaf 15. It is further possible that the cut-out portion 35 be situated in any position (e.g., in any one of the four corners) of the front cover 5, the back cover 10 and/or the leaf 15.

Furthermore, it is possible for the book 1 to have more than one cut-out portion. For example, the book 1 may have two, three, or four cut-out portions in every corner of the front cover 5, the back cover 10 and/or the leaf 15.

What is claimed is:

1. A book comprising:

a front cover;

a back cover;

at least one leaf situated between the front cover and the back cover;

a coupling arrangement coupling the front cover, the at least one leaf and the back cover, wherein at least one of the front cover, the back cover and the at least one leaf has a cut-out portion; and a rotation member capable of being rotatable more than 180° within the cut-out portion about a first axis, the first axis extending along a plane of the at least one of the front cover, the back cover and the at least one leaf.

2. The book according to claim 1, further comprising:

a coupling member connecting the rotation member to at least one of the front cover, the back cover and the at least one leaf.

3. The book according to claim 1, wherein the rotation member is composed of one of a plastic material, a paper material and a magnetic material.

4. The book according to claim 1, wherein the cut-out portion is situated in one of a center position of at least one of the front cover, the back cover and the at least one leaf.

5. The book according to claim 1, further comprising:

an arrangement coupled to the cut-out portion, the arrangement connecting the rotation member to at least one of the front cover, the back cover and the at least one leaf.

6. The book according to claim 1, wherein the rotation member has one of a circular shape, a triangular shape, a square shape and a character shape.

7. The book according to claim 1, wherein the at least one cut-out portion has one of a circular shapes a triangular shape, and a square shape and a character shape.

8. The book according to claim 1, wherein the coupling arrangement includes at least one binding member.

9. A book comprising:

a front cover;

a back cover;

at least one leaf situated between the front cover and the back cover;

a coupling arrangement coupling the front cover, the at least one leaf and the back cover, wherein at least one of the front cover, the back cover and the at least one leaf has a cut-out portion;

a rotation member being rotatable within the cut-out portion about a first axis, the first axis extending along a plane of the at least one of the front cover, the back cover and the at least one leaf;

a first coupling member coupling the rotation member to one of the front cover, the back cover, and the least one leaf;

a second coupling member situated substantially opposite to the first coupling member and coupling the rotation member to one of the front cover, the back cover, and the least one leaf;

at least one first attaching device being situated at the cut-out portion; and at least one second attaching device being situated at the cut-out portion situated substantially opposite to the at least one first attaching device, wherein the first coupling member is one of releasibly coupled and permanently coupled to the at least one first attaching device, and the second coupling member is one of releasibly coupled and permanently coupled to the at least one second attaching device.

10. The book according to claim 9, wherein the first coupling member, the second coupling member, the first attaching device, and the second attaching device are composed of one of a soft material, a stretchable material, a magnetic material, a cord material, and a wire material.

11. A book comprising a front cover;

a back cover;

at least one leaf situated between the front cover and the back cover:

a coupling arrangement coupling the front cover, the at least one leaf and the back cover, wherein at least one of the front cover the back cover and the at least one leaf has a cut-out portion; and a rotation member being rotatable within the cut-out portion about a first axis, the first axis extending along a plane of the at least one of the front cover the back cover and the at least one leaf, a side of the rotation member having one of a picture and a text.

12. A book comprising:

a front cover;

a back cover;

at least one leaf situated between the front cover and the back cover;

a coupling arrangement coupling the front cover, the at least one leaf and the back cover, wherein at least one of the front cover, the back cover and the at least one leaf has a cut-out portion;

a rotation member being rotatable within the cut-out portion about a first axis, the first axis extending along a plane of the at least one of the front cover, the back cover and the at least one leaf;

an arrangement coupled to the cut-out portion, the arrangement connecting the rotation member to at least one of the front cover, the back cover and the at least one leaf; and a ring member releasibly connected to the arrangement, the ring member connecting the rotation member to at least one of the front cover, the back cover and the at least one leaf.

13. The book according to claim 12, wherein the arrangement, the ring member, and the rotation member are composed of a magnetic material.

14. The book according to claim 12, wherein the rotation member rotates about a second axis, the second axis extending perpendicular to the plane extending along at least one of the front cover, the back cover and the at least one leaf.

15. A book comprising:

a front cover;

a back cover;

at least one leaf situated between the front cover and the back cover;

a coupling arrangement coupling the front cover, the at least one leaf and the back cover, wherein at least one of the front cover, the back cover and the at least one leaf has a cut-out portion;

a rotation member being rotatable within the cut-out portion about a first axis, the first axis extending along a plane of the at least one of the front cover, the back cover and the at least one leaf; and an arrangement coupled to the cut-out portion, the arrangement connecting the rotation member to at least one of the front cover, the back cover and the at least one leaf, wherein the arrangement and the rotation member are composed of a magnetic material.

16. A book comprising:

a front cover;

a back cover;

at least one leaf situated between the front cover and the back cover;

a coupling arrangement coupling the front cover, the at least one leaf and the back cover, wherein at least one of the front cover, the back cover and the at least one leaf has a cut-out portion; and a rotation member capable of being rotatable more than 180° within the cut-out portion about a first axis, the first axis extending along a plane of the at least one of the front cover, the back cover and the at least one leaf, the rotation member rotating about a second axis, the second axis extending perpendicular to the plane extending along at least one of the front cover, the back cover and the at least one leaf.

17. A book comprising:

a front cover;

a back cover;

at least one leaf situated between the front cover and the back cover;

a coupling arrangement coupling the front cover, the at least one leaf and the back cover, wherein at least one of the front cover, the back cover and the at least one leaf has a cut-out portion;

a rotation member being rotatable within the cut-out portion about a first axis, the first axis extending alone a plane of the at least one of the front cover, the back cover and the at least one leaf; and a coupling member connecting the rotation member to at least one of the front cover, the back cover and the at least one leaf, the coupling member being composed of one of a soft material, a stretchable material, a magnetic material, a cord material, and a wire material.

18. A book comprising:

a front cover;

a back cover;

at least one leaf situated between the front cover and the back cover;

a coupling arrangement coupling the front cover, the at least one leaf and the back cover, wherein at least one of the front cover, the back cover and the at least one leaf has a cut-out portion;

a rotation member being rotatable within the cut-out portion about a first axis, the first axis extending along a plane of the at least one of the front cover, the back cover and the at least one leaf, the rotation member rotating about a second axis, the second axis extending perpendicular to the plane extending along at least one of the front cover, the back cover and the at least one leaf; and an arrangement coupled to the cut-out portion, the arrangement connecting the rotation member to at least one of the front cover, the back cover and the at least one leaf.

19. A book comprising:

a front cover;

a back cover;

at least one leaf situated between the front cover and the back cover;

a coupling arrangement coupling the front cover the at least one leaf and the back cover, wherein at least one of the front cover, the back cover and the at least one leaf has a cut-out portion; and a rotation member being rotatable within the cut-out portion about a first axis, the first axis extending along a plane of the at least one of the front cover, the back cover and the at least one leaf;

wherein a shape of cut-out portion is different from a shape of the rotation member.

20. A book comprising:

a front cover;

a back cover;

at least one leaf situated between the front cover and the back cover;

a coupling arrangement coupling the front cover, the at least one leaf and the back cover, wherein at least one of the front cover, the back cover and the at least one leaf has a cut-out portion, the coupling arrangement including at least one binding member, the at least one binding member including at least one binding ring; and a rotation member being rotatable within the cut-out portion about a first axis, the first axis extending along a plane of the at least one of the front cover, the back cover and the at least one leaf.

* * * * *

UNITED STATES PATENT AND TRADEMARK OFFICE

CERTIFICATE OF CORRECTION

PATENT NO. : 5,954,518
DATED : September 21, 1999
INVENTOR(S) : Teichberg

It is certified that error appears in the above-identified patent and that said Letters Patent is hereby corrected as shown below:

Column 6, line 43, change "cover the" to -- cover, the --.

Column 6, line 47, change "cover the" to -- cover, the --.

Column 7, line 61, change "alone" to -- along --.

Signed and Sealed this

First Day of May, 2001

Attest:

Nicholas P. Godici

NICHOLAS P. GODICI

*Attesting Officer* *Acting Director of the United States Patent and Trademark Office*